United States Patent
Ghosh et al.

(10) Patent No.: US 11,909,857 B2
(45) Date of Patent: Feb. 20, 2024

(54) FUNCTIONALLY SAFE ENCRYPTION FOR VEHICLE TO ANYTHING COMMUNICATION

(71) Applicant: Intel Corporation, Santa Clara, CA (US)

(72) Inventors: Santosh Ghosh, Hillsboro, OR (US); Marcio Juliato, Portland, OR (US); Rafael Misoczki, Hillsboro, OR (US); Manoj Sastry, Portland, OR (US); Liuyang Yang, Portland, OR (US); Shabbir Ahmed, Beaverton, OR (US); Christopher Gutierrez, Hillsboro, OR (US); Xiruo Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 16/724,732

(22) Filed: Dec. 23, 2019

(65) Prior Publication Data

US 2020/0145188 A1    May 7, 2020

(51) Int. Cl.
*H04L 9/06* (2006.01)
*H04L 9/32* (2006.01)
*H04W 4/40* (2018.01)

(52) U.S. Cl.
CPC .......... *H04L 9/0631* (2013.01); *H04L 9/0637* (2013.01); *H04L 9/3242* (2013.01); *H04W 4/40* (2018.02); *H04L 2209/26* (2013.01); *H04L 2209/601* (2013.01)

(58) Field of Classification Search
CPC ... H04L 9/0631; H04L 9/0637; H04L 9/3242; H04W 4/40; G06F 2207/581
See application file for complete search history.

(56) References Cited

U.S. PATENT DOCUMENTS

| | | | | |
|---|---|---|---|---|
| 6,766,344 B2 * | 7/2004 | Dubey | ................. | G06F 7/724 708/492 |
| 7,050,249 B1 * | 5/2006 | Chue | ................. | G11B 5/59683 360/31 |
| 7,532,721 B2 * | 5/2009 | Zhang | ................. | H04L 9/0631 380/28 |
| 7,715,551 B2 * | 5/2010 | Plessier | ................. | H04L 9/3066 380/2 |
| 7,779,272 B2 * | 8/2010 | Lee | ................. | H04L 9/0625 713/189 |
| 7,860,240 B2 * | 12/2010 | Mathew | ................. | H04L 9/0631 380/28 |

(Continued)

OTHER PUBLICATIONS

"Advanced Encryption Standard (AES)", Federal Information Processing Standards Publication 197, Nov. 26, 2001.
Satoh et al., "Unified Hardware Architecture for 128-Bit Block Ciphers AES and Camellia", C.D. Walter et al. (Eds.): CHES 2003, LNCS 2779, pp. 304-318, 2003.
Cameron P.J. and Siedel J. J., "Quadratic Forms Over GF(2)" Mathematics—1972.

(Continued)

*Primary Examiner* — Zachary A. Davis
(74) *Attorney, Agent, or Firm* — KDW Firm PLLC

(57) ABSTRACT

Systems, apparatus, methods, and techniques for functional safe execution of encryption operations are provided. A fault tolerant counter and a complementary pair of encryption flows are provided. The fault tolerant counter may be based on a gray code counter and a hamming distance checker. The complementary pair of encryption flows have different implementations. The output from the complementary pair of encryption flows can be compared, and where different, errors generated.

20 Claims, 9 Drawing Sheets

(56) References Cited

U.S. PATENT DOCUMENTS

| | | | | |
|---|---|---|---|---|
| 7,965,836 | B2* | 6/2011 | Ahn | H04L 9/003 380/37 |
| 8,155,308 | B1* | 4/2012 | Poo | H04L 9/0637 380/29 |
| 8,265,273 | B2* | 9/2012 | Yokota | H04L 9/0631 380/252 |
| 8,640,065 | B2* | 1/2014 | Janssen | G06F 30/3323 716/112 |
| 8,649,511 | B2* | 2/2014 | Hung | H04L 9/0631 380/28 |
| 8,837,769 | B2* | 9/2014 | Yang | G06K 9/00744 382/100 |
| 8,923,510 | B2* | 12/2014 | Gueron | G06F 9/3887 708/492 |
| 8,953,784 | B2* | 2/2015 | Gong | H04L 9/0662 380/28 |
| 9,025,766 | B2* | 5/2015 | Jankowski | G09C 1/00 380/29 |
| 9,172,534 | B2* | 10/2015 | Nishimura | H04L 9/0861 |
| 9,525,546 | B2* | 12/2016 | Alon | H04L 9/0618 |
| 9,667,410 | B2* | 5/2017 | Oshida | H04L 9/002 |
| 9,843,441 | B2* | 12/2017 | Mathew | H04L 9/0631 |
| 9,910,792 | B2* | 3/2018 | Satpathy | G06F 21/72 |
| 11,418,317 | B2* | 8/2022 | Kreimer | H04L 9/0618 |
| 2022/0045839 | A1* | 2/2022 | Kreimer | H04L 9/0618 |

OTHER PUBLICATIONS

Hoheisel; Andreas., "Side-Channel Analysis Resistant Implementation of AES on Automotive Processors" Master Thesis—Ruhr-University Bochum.

Jutla et al., "On the Circuit Complexity of Isomorphic Galois Field Transformations" IBM Research Report—Nov. 22, 2022.

Paar; Christof and Soria-Rodriguez; Pedro., "Fast Arithmetic Architectures for Public-Key Algorithms over Galois Fields $GF((2^n)^m)$" Advances in Cryptology—Eurocrypt '97.

Rudra et al., "Efficient Rijndael Encryption Implementation with Composite Field Arithmetic" CHES 2001, LNCS 2162, pp. 171-184, 2001.

Satoh et al., "A Compact Rijndael Hardware Architecture with S-Box Optimization" ASIACRYPT 2001, LNCS 2248, pp. 239-254, 2001.

Satoh; Akashi and Morioka; Sumio., "Unified Hardware Architecture for 128-Bit Block Ciphers AES and Camellia" CHES 2003, LNCS 2779, pp. 304-318, 2003.

Sunar et al., "Constructing Composite Field Representation for Efficient Conversion" IEEE Transaction on Computers, vol. 52, No. 11, Nov. 2003.

Uneo et al., "Highly Efficient GF $(2^8)$ Inversion Circuit Based on Redundant GF Arithmetic and Its Application to AES Design" CHES 2015, LNCS 9293, pp. 63-80, 2015.

* cited by examiner

FUNCTIONALLY SAFE ENCRYPTION FOR VEHICLE TO ANYTHING COMMUNICATION

TECHNICAL FIELD

Embodiments described herein generally relate to encrypting communication with a vehicle.

BACKGROUND

In vehicular networks, vehicles may be configured to communicate with other devices (e.g., other vehicles, roadside infrastructure, or the like). This is often referred to as vehicle-to-anything (V2X) communication. V2X communication can include vehicle-to-vehicle (V2V) communication and/or vehicle-to-infrastructure (V2I) communication. Vehicular networks (e.g., supporting V2X communication, or the like) may be multi-hop communication networks and may facilitate the communication of real-time traffic information (e.g., congestion, accidents, construction, etc.) and information associated with individual vehicles (e.g., speed, location, direction of travel, etc.) for various transportation-based use cases, such as accident avoidance, route optimization, or platooning.

SUMMARY

Not Applicable

DETAILED DESCRIPTION

Various embodiments are generally directed to encryption for V2X communication. In many V2X applications, encryption of message traffic is desired. In some examples, such as, platooning, encryption may be necessary to preserve the efficiency and safety of the platoon. Said differently, encryption of messages between members of the platoon may be required to ensure the continued safety and efficiency of the platoon. The present disclosure provides functional safe (FUSA) execution of encryption operations. In particular, the present disclosure provides an encryption system that is FUSA compliant. The disclosed FUSA encryption system can be implemented in hardware circuitry arranged to execute the encryption operations. Furthermore, the disclosure FUSA encryption system can be implemented in software, such as, at the application level in a V2X communication device.

In general, the present disclosure provides fault tolerant encryption based on a fault tolerant counter and a complementary pair of encryption flows. The fault tolerant counter may be based on a Gray code counter and a Hamming distance checker. The complementary pair of encryption flows have different implementations. The output from the complementary pair of encryption flows can be compared, and where different, errors generated. In some examples, the fault tolerant counter and the fault tolerant encryption engines (including the complementary pair of encryption engines) can be implemented in circuitry arranged to carry out the functions describe herein. In other examples, the fault tolerant counter and the fault tolerant encryption engines (including the complementary pair of encryption engines) can be implemented in software.

These and other examples are described in greater detail below. In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
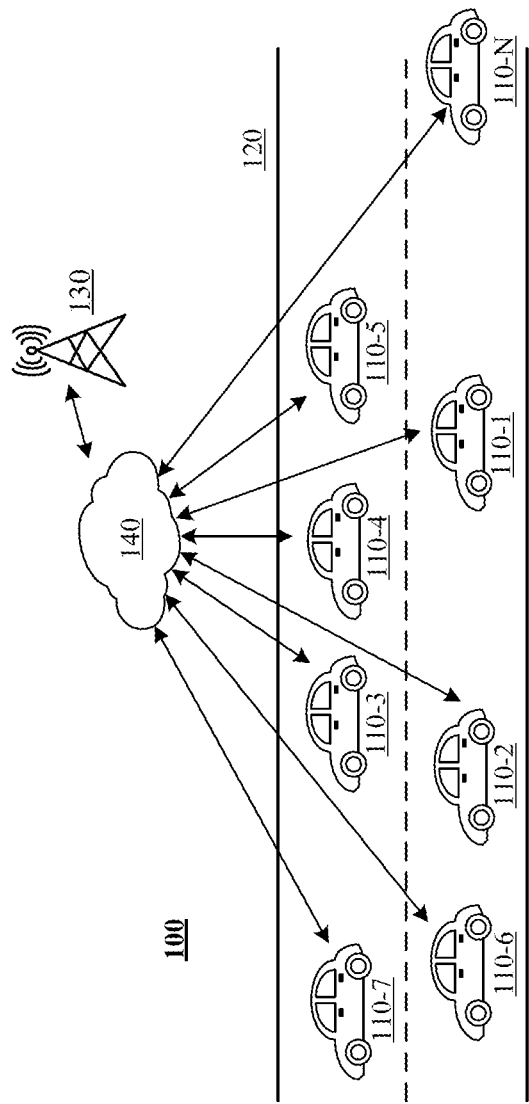
FIG. 1 illustrates a system of vehicles and roadside unit arranged to communicate in a V2X network.

FIG. 1 illustrates a system 100 including a number of connected vehicles 110 traveling on a roadway 120 with a road-side unit (RSU) 130 adjacent to the roadway 120. Although these figures illustrate the RSU 130 being arranged at a side of the roadway 120, it may be understood that the RSU 130 may be arranged anywhere (e.g., top, bottom, etc.) near the roadway 120 or in any fashion that allows the RSU 130 to communicate with the vehicles (and vice versa). Moreover, it may be understood that the vehicles connected to the vehicular network may not be limited to motor-based vehicles (e.g., gas, diesel, electric), but may be any suitable vehicle configured to perform V2X communication, such as railed vehicles (e.g., trains, trams), watercrafts (e.g., ships, boats), aircraft (airplanes, spaceships, satellites, etc.) and the like. Lastly, the RSU 130 may be mobile and not fixed as depicted.

Any number of vehicles 110 can travel of roadway 120, for example, vehicles 110-1, 110-2, 110-3, 110-4, 110-5, 110-6, 110-7 through 110-N are depicted. RSU 130 and vehicles 110 can include circuitry arranged to facilitate V2X communication. For example, FIG. 1 depicts vehicles 110 communicatively coupled each other and to RSU 130 via a V2X network 140. V2X network 140 can enable communication, or said differently, transmission of signals indicating messages, based on any number of communication schemes or standards. For example, V2X network 140 may support communication based the 802.11p Dedicated Short Range Communications standard promulgated by the Institute of Electrical and Electronic Engineers (IEEE), cellular and long-term evolution (LTE) standards promulgated by the $3^{rd}$ Generation Partnership Project (3GPP). Additionally, the messages communicated via V2X network 140 may be based on one or more standards, such as, SAE J2735, which defines Basic Safety Messages (BSM) or the IEEE 1609.2 standard for Wireless Access in Vehicular Environments, among other standards.

It is noted, IEEE 1609.2 specifies encryption based on an elliptic curve integrated encryption scheme (ECIES) and an advanced encryption standard (AES) block cipher with counter cipher-block-chaining message authentication code (CBC-MAC) (AES-CCM) modes. Accordingly, in some examples, vehicles 110 and RSU 130 are arranged to communicate via V2X network 140 and encrypt message traffic based on ECIES and AES-CCM. The present disclosure provides a functionally safe (FUSA) encryption technique and circuitry arranged to provide FUSA encryption. Accordingly, the present disclosure can be implemented to provide V2X communication in compliance with IEEE 1609.2. Furthermore, as the encryption is implemented in a FUSA manner, the system may be certified automotive safety integrity level (ASIL) (D), which requires FUSA execution of encryption operations. It is noted that ASIL D certification may be required for various automotive applications (e.g., autonomous driving, collision avoidance, hand free driving, etc.).

Figure 2:
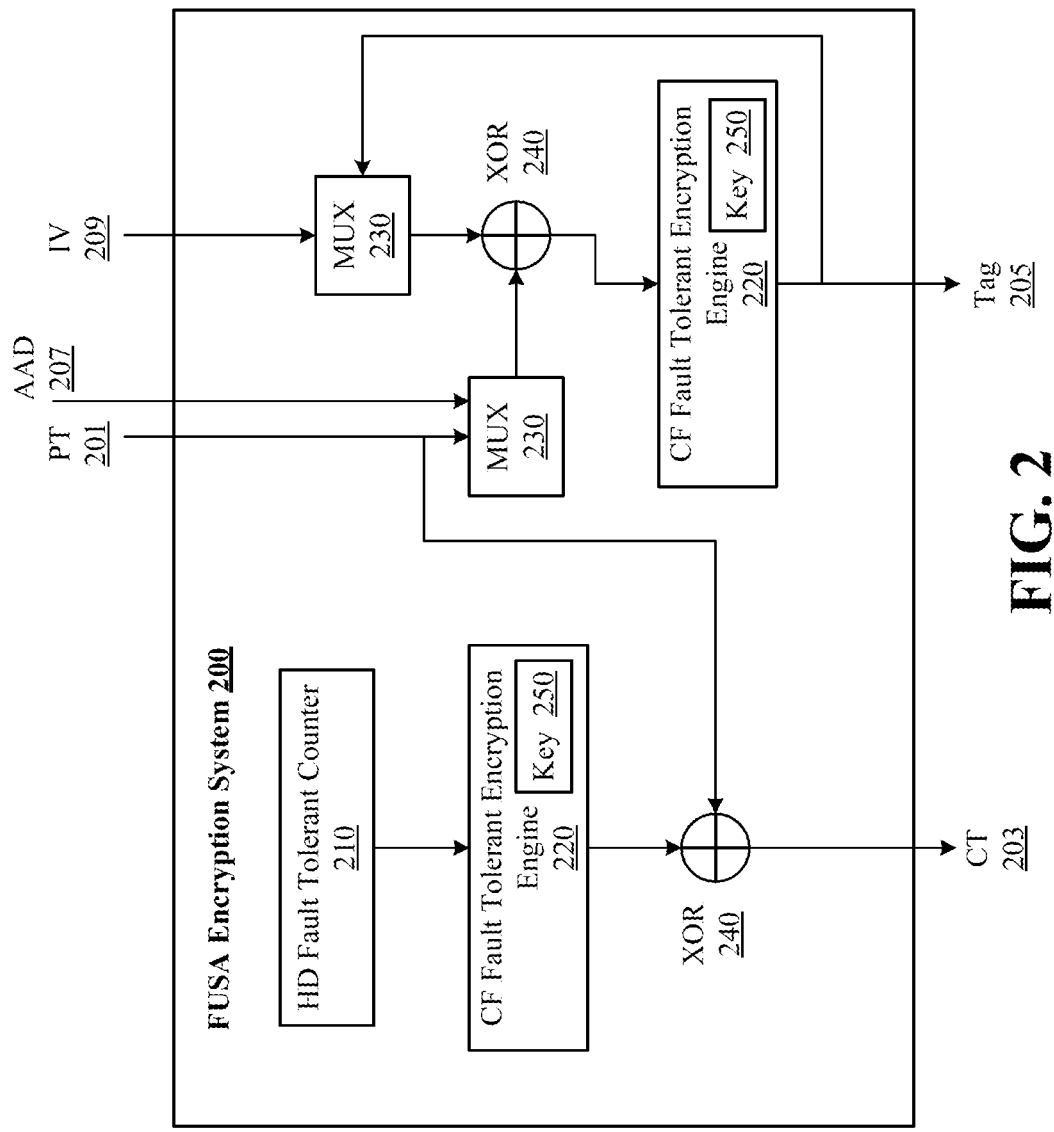
FIG. 2 illustrates a functional safe (FUSA) encryption system.

FIG. 2 illustrates a functionally safe (FUSA) encryption system 200. FUSA encryption system 200 can be implemented in one of vehicles 110 or RSU 130 of system 100 in FIG. 1 to provide FUSA encryption for messages communicated over V2X network 140. Furthermore, it is noted that the FUSA encryption system 200 could be implemented in another device, different from the devices in system 100, arranged to encrypt communication traffic transmitted over a network.

FUSA encryption system 200 includes a Hamming distance (HD) fault tolerant counter 210, a complementary flow fault tolerant encryption engine 220, multiplexers 230, and Exclusive OR (XOR) operators 240. During operation, plaint text (PT) data 201 can be provided to FUSA encryption system 200 and used to generate cypher text (CT) 203 and tag 205. Cypher text 203 along with tag 205 can be used to recover plain text 201. Generally, plain text 201 can be encrypted into cypher text 205 by the pair of complementary flow fault tolerant encryption engines 220 while the tag 205 can be generated by one of the complementary flow fault tolerant encryption engines 220, where the key 250 is used to encrypt the plain text 201 into cypher text 203. The plain text 201 can be recovered with the tag 205 and the cypher text 203. Furthermore, FUSA encryption system 200 can authenticate additional data 207 and may use a nonce (or initial value (IV)) 209 during encryption/decryption. It is noted that this figure depicts two complementary flow fault tolerant encryption engines 220. In some examples, the system 200 could include 1 (one) complementary flow fault tolerant encryption engine 220 and it could be multiplexed to provide the operations described below.

In some implementations, the complementary flow fault tolerant encryption engines 220 can execute an AES encryption algorithm. It is noted that the present disclosure can be applied to a number of different encryption algorithms and is not limited to AES-CCM. More particularly, the present disclosure could be applied to other encryption algorithms, such as, the elliptic-curve Diffie-Hellman (ECDH) key agreement protocol, digital signature algorithm (DSA) encryption, data encryption standard (DES), or the like. Furthermore, the present disclosure can be applied to authenticated encryption algorithms (like AES-CCM), such as, DSA or the elliptic-curve digital signature algorithm (ECDSA). However, for convenience, the present disclosure provides the example of AES-CCM encryption for purposes of explanation. Further, as noted above, AES-CCM may be necessary to comply with standards in certain contents, such as, for example V2X communication.

Although the present disclosure can be implemented independently from the underlying encryption algorithm itself, a general discussion of AES-CCM is provided here for purposes of explanation.

During operation, FUSA encryption system 200 can receive plain text 201. The plain text 201 may correspond to data to be encrypted and transmitted as a message or messages via a network (e.g., V2X network 140, or the like). The message can be transmitted as payload blocks, which will often have a specific size (e.g., 128 bits, or the like). Header blocks may also be communicated along with payload blocks. The payload blocks may be encrypted and may include the cypher text 203 while the header blocks may be unencrypted and can include information used to authenticate the message (e.g., the tag 205).

FUSA encryption system 200 can receive plain text 201 to be encrypted and can split plain text into blocks of a set size (e.g., 128 bits, or the like). To generate the cypher text 203 (or blocks of cypher text), blocks of plain text 201 are taken and XORed with a counter block generated by Hamming distance fault tolerant counter 210 that has been cyphered by complementary flow fault tolerant encryption engine 220 using key 205, to produce a cypher text block of cypher text 203. Recovery of the plain text 201 from cypher text 203 can be done by XORing the cypher text block with another cyphered counter block generated in the same manner as described above.

Additionally, FUSA encryption system 200 can be used to generate tag 205 that can be used to authenticate the cypher text 203. FUSA encryption system 200 can multiplex blocks of plain text 201 with blocks of additional data 207 and XOR this with either initial value 209 (in the first pass) or a cyphered block during subsequent passes. The result of the XOR operation can be cyphered by complementary flow fault tolerant encryption engines 220 with key 250. The result of the cypher of the first block is XORed with the second block and again cyphered. This process is repeated until all blocks are cyphered to obtain the tag 205. It is noted that additional data 207 is optional as well as is initial value 209. Authentication of the cypher text 203 can be done given the tag 205.

As noted above, the AES-CCM scheme detailed herein is given for example only. It is to be appreciated that a number of encryption algorithms, including those based on counters can be implemented in a FUSA manner. The disclosure provided here provides a fault tolerant counter as well as a fault tolerant encryption engine that can be used to provide FUSA execution of encryption for AES-CCM, as well as other algorithms.

Figure 3:
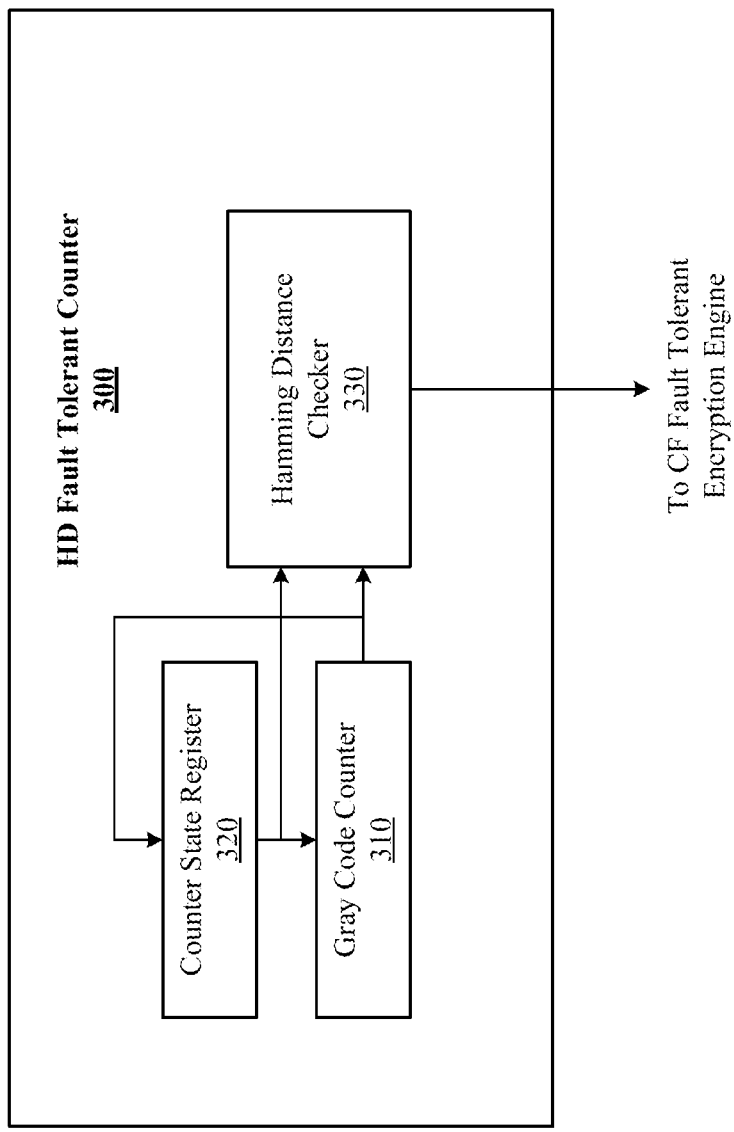
FIG. 3 illustrates a fault tolerant counter of the FUSA encryption system of FIG. 2.

FIG. 3 illustrates a Hamming distance fault tolerant counter 300 that can be implemented as the HD fault tolerant counter 210 of the FUSA encryption system 200 of FIG. 2. In other examples, Hamming distance fault tolerant counter 300 could be implemented as a counter in another counter mode encryption system, different than the system 200. Hamming distance fault tolerant counter 300 includes a Gray code 310, a counter state register 320 and a Hamming distance checker 330. Gray code counter 310 can be any type of counter (e.g., adder circuitry, hardware register, software variable, or the like) arranged to count in Gray code. In some examples, Gray code counter 310 can be initialized at 0 (zero) and can be incremented by 1 (one) in Gray code each time a block is generated. Counter state register 320 is arranged to store the state of Gray code counter 320. Hamming distance checker 330 can be implemented as circuitry (e.g., bit-wise XOR circuitry, or the like) or as software.

The output from both Gray code counter 310 and counter state register 320 is input to Hamming distance checker 330. Hamming distance checker 330 is arranged to determine a Hamming distance between the Gray code counter 310 output and the value in counter state register 320, which corresponds to the previous output from Gray code counter 310. It is to be appreciated that the Hamming distance between any two consecutive Gray code values is 1. As such, where the Hamming distance checker 330 determines that the Hamming distance between the Gray code counter 310 output and the value in counter state register 320 is 1, the output from Gray code counter 310 is passed to a complementary flow fault tolerant encryption engine (e.g., engine 220 of FIG. 2, or the like). However, where the Hamming distance checker 330 determines that the Hamming distance between the Gray code counter 310 output and the value in counter state register 320 is 1, an alert or flag can be set indicating a fault (e.g., with counter 300, or the like). In some examples, output from counter 310 can be 64 bits.

It is noted, that Hamming distance fault tolerant counter 300 could be implemented as described above to provide fault detection. However, a Hamming code could be added to counter blocks to provide error correction in addition to the fault detection. For example, where counter blocks are 64 bits, a 3-bit Hamming code could be added for every 4-bits data in the counter blocks. As such, a counter block with 112 bits (e.g., 64 bits counter block and 48 bits error correction) could be provided.

Figure 4:
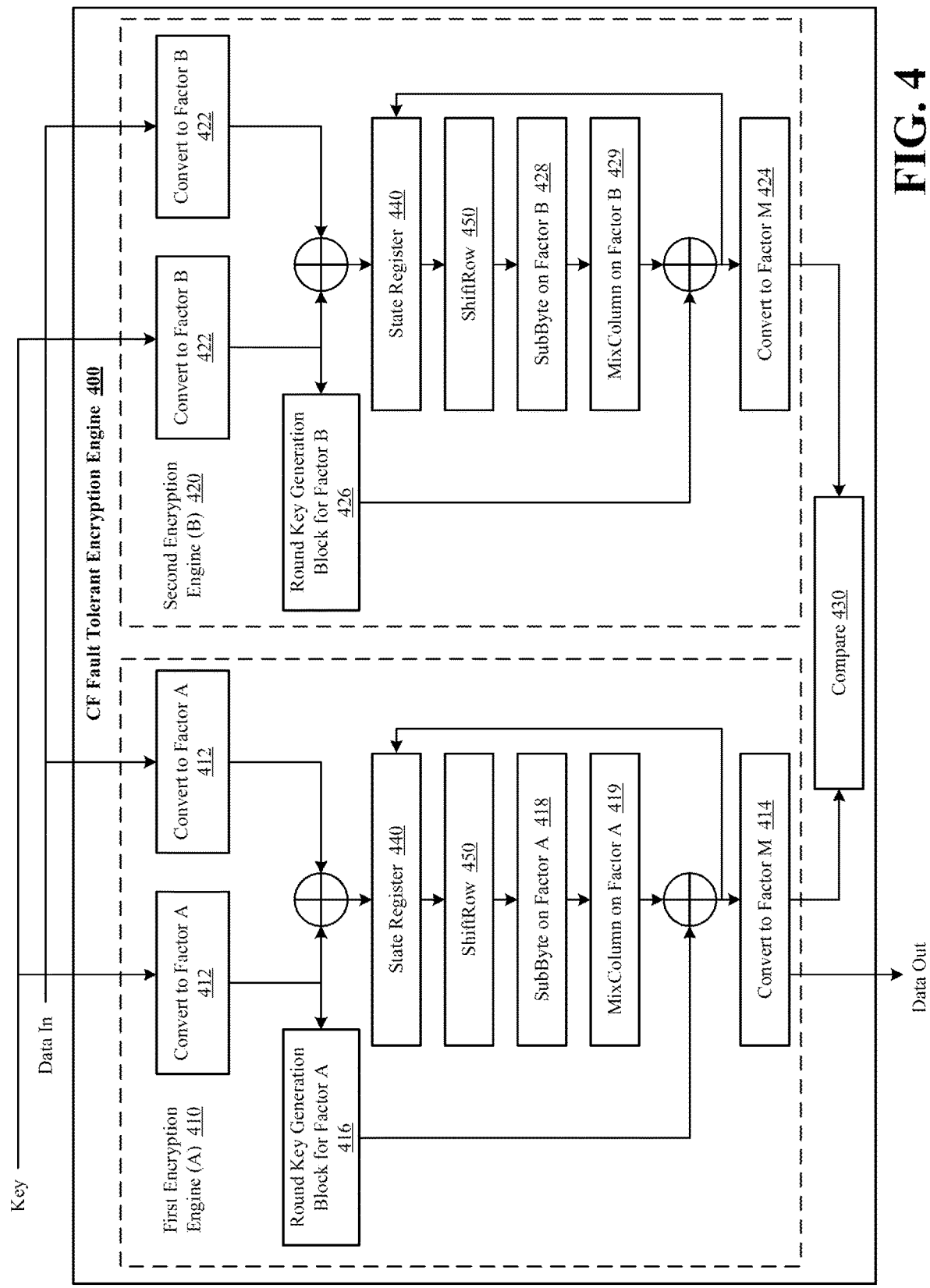
FIG. 4 illustrates complementary flow fault tolerant encryption engine of the FUSA encryption system of FIG. 2.

FIG. 4 illustrates a complementary flow fault tolerant encryption engine 400 that can be implemented as the complementary flow fault tolerant encryption engine 220 of the FUSA encryption system 200 of FIG. 2. In other examples, complementary flow fault tolerant encryption engine 400 could be implemented as a fault tolerant encryption engine in another encryption system, different than the system 200.

In general, complementary flow fault tolerant encryption engine 400 is arranged to take data in (e.g., counter block, text block, etc.) and generate data out from the data in and a key. The key can be a variety of cryptographic keys having a variety of lengths (e.g., 128 bits, 192 bits, 256 bits, or the like). The present example uses a key and data in block having a length of 128 bits. However, examples are not limited in this context and the disclosure can be applied to a variety of different bit lengths.

Data or a key having 128 bits has 16 bytes. This can be represented as $2^i$. Complementary flow fault tolerant encryption engine 400 includes a first encryption engine (A) 410 (or encryption engine A 410) and a second encryption engine (B) 420 (or encryption engine B 420). In general, the encryption engine A 410 and encryption engine B 420 are identical except for the power with which the encryption algorithm is applied. For example, as noted above, a 128 bit key and data block, that is data having 16 bytes, can be represented as having a Galois Field (GF) of $2^8$, written as $GF(2^8)$. As such, conventional encryption engines would apply the encryption algorithm on a data and a key having $GF(2^8)$. However, the present disclosure provides that the initial GF is factored based on a first factor A and a second factor B, where the encryption engine A 410 operates on the first GF factor and the encryption engine B 420 operates on the second GF factor.

For example, encryption engine A 410 includes blocks 412 to convert the GF of data in and key from having a GF factor M to having a GF factor A. As a specific example, blocks 412 can be arranged to convert, respectively, data and key having $GF(2^8)$ to having $GF(2^4)^2$. Similarly, encryption engine B 420 includes blocks 422 to convert the GF of data in and key from having a GF factor M to having a GF factor B. As a specific example, blocks 422 can be arranged to convert, respectively, data and key having $GF(2^8)$ to having $GF((2^2)^2)^2$. Subsequently, encryption engine A 410 can operate on $GF(2^4)^2$ while encryption engine B can operate on $GF((2^2)^2)^2$.

Subsequently, encryption engine A 410 and encryption engine B 420 can generate cyphers of the data in given the key, where the GF of the generated cypher has the GF associated with the respective engine. Encryption engine A 410 includes block 414 to convert the GF of the cypher from having a GF factor A to having a GF factor M. As a specific example, block 414 can be arranged to convert, respectively, cypher data having $GF(2^4)^2$ to having $GF(2^8)$. Similarly, encryption engine B 420 includes block 424 to convert the GF of cypher data from having a GF factor B to having a GF factor M. As a specific example, block 414 can be arranged to convert, respectively, cypher data having $GF((2^2)^2)^2$ to having $GF(2^8)$. The converted cypher data, now having the same GF factor, is compared at block 430. Where the outputs from each encryption engine 410 and 420 do not match, errors can be flagged. However, where the outputs do match, then data from one of the engines (e.g., encryption engine A 410, or the like) can be used as the cypher.

As outlined above, the present disclosure can be applied to AES-CCM. For example, for AES-CCM in V2X applications, encryption engine A 410 and encryption engine B 420 can be used for data encryption (e.g., with fault tolerant counter 300) as well as for generating authentication tags. Said differently, encryption engine A 410 and encryption engine B 420 can generate authentication tags for CBC-MAC mode of an AES-CCM application.

It is to be appreciated, for AES-CCM application in V2X, a receiver device (e.g., vehicle 110, RSU 130, or the like) receives the encrypted data and an authentication tag. The device can decrypt the received data (e.g., utilizing the fault tolerant encryption procedure described herein) and can store the decrypted data from both encryption engine A 410 and encryption engine B 420. The receiver device computes (sometimes referred to as recompute) an authentication tag on the received encrypted data through encryption engine A 410 and encryption engine B 420 (e.g., parallel encryption engines). Subsequently, the receiver device determines whether the computed tags (e.g., tags computed via encryption engine A 410 and encryption engine B 420) match the received authentication tag. If either of the computed tags match the received tag, the decrypted data associated with the encryption engine of the matched tag (e.g., encryption engine A 410 or encryption engine B 420) is utilized as the correct expected data. If neither computed tag matches the received authentication tag, then receiver device discards the data.

It is noted that this presents a more efficient design that conventional methods. More particularly, triple mode redundancy (TMR) is a conventional standard for fault tolerance. However, this requires triple the area to implement. For example, circuitry arranged to encrypt data using TMR requires three distinct encryptions engines. However, the present disclosure provides comparable fault tolerance to TMR with double the area as opposed to triple the area. Thus, an area savings can be realized.

Although the present disclosure can be applied to a number of encryption algorithms (e.g., AES, DES, ECDH, DSA, or the like) AES is used as an example to describe other "blocks" or components of complementary fault tolerance encryption engine 400. As used here, the "blocks" of engine 400 depicted in FIG. 4 can be implemented as hardware (e.g., logic gates, registers, etc.) or software. Examples are not limited in this context.

Each of encryption engines A 410 and B 420 include a round key generation block for the factor associated with the particular engine. For example, encryption engines A 410 includes round key generation block for factor A 416 while encryption engines B 420 includes round key generation block for factor B 426. In general, blocks 416 and 426 can be arranged to derive a key schedule from the cipher key, for example, based on Rijndael's key schedule, or the like. However, as noted, since the encryption engines A 410 and B 420 operate on different GF factors (e.g., $GF(2^4)^2$, $GF((2^2)^2)^2$, or the like) the key schedule generated by blocks 416 and 426 will be different. Said differently, blocks 416 and 426 are arranged to generate key scheduled based on the GF factor of the respective engine.

Encryption engines A 410 and B 420 further include state register blocks 440 and ShiftRow blocks 450. Additionally, encryption engines A 410 and B 420 further include SubByte on factor blocks and MixColumn on factor blocks where the factor is associated with the factor of the respective engine. For example, encryption engines A 410 includes SubByte on factor A 418 and MixColumn on factor A 419 while encryption engines B 420 includes SubByte on factor B 428 and MixColumn on factor B 429.

In general, state register blocks 440 store the state of the cycpher data during the iterative encryption process. The ShiftRow blocks 450 are arranged to implement a transposition step where the last three rows of the state are shifted cyclically a set number of steps. The SubByte on factor blocks (e.g., blocks 418 and 428) are arranged to implement a non-linear substitution step where each byte is replaced with another according to a lookup table. Lastly, MixColumn blocks (e.g., blocks 419 and 429) are arranged to implement a linear mixing operation which operates on the columns of the state, combining the four bytes in each column.

Figure 5:
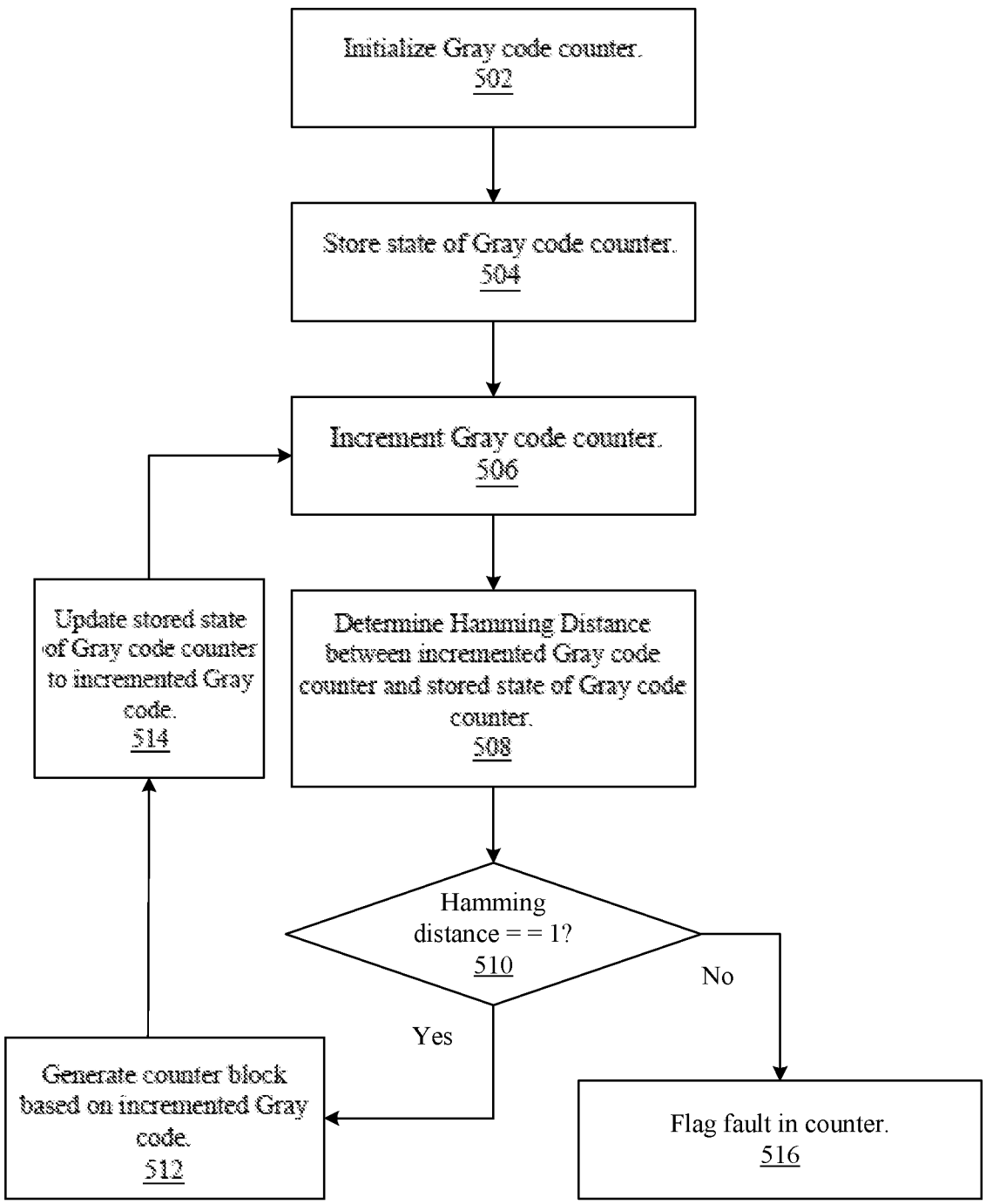
FIG. 5 illustrates a logic flow for a fault tolerant counter.

FIG. 5 illustrates an example flow diagram 500 for a fault tolerant counter for encryption operations, according to embodiments of the present disclosure. It may be understood that the features described in each block may be executed by processing circuitry, such as, processing circuitry in a device arranged to encrypt/decrypt data for communication via a network (e.g., a V2X network) or the like. For example, one of vehicles 110 and/or RSU 130 can implement logic flow 500 as part of an encryption/decryption process during communication via V2X network 140. As a specific example, HD fault tolerant counter 300 can implement logic flow 500.

Logic flow 500 can begin at block 502. At block 502, a Gray code counter can be initialized. For example, Gray code counter 310 of HD fault tolerant counter 300 can be initialized. Continuing to block 504, the state of the Gray code counter can be stored. For example, counter state register 320 can store the state of the Gray code counter 310. Continuing to block 506, the Gray code counter can be incremented. For example, the Gray code counter 310 can be incremented. Continuing to block 508, a Hamming distance between the incremented Gray code and the stored state of the Gray code counter can be determined. For example, Hamming distance checker 330 can determine the Hamming distance between the incremented Gray code (e.g., current state of the Gray code counter 310) with the stored stated of the Gray code counter (e.g., the prior state of the Gray code counter 310 as stored in counter state register 320).

Continuing to decision block 510, it is determined whether the Hamming distance equals 1. For example, processing circuitry of HD fault tolerant counter 300 can determine whether the Hamming distance (e.g., as determined by Hamming distance checker 330) equals 1. From decision block 510 logic flow 500 can continue to either block 512 or block 516. For example, the logic flow 500 can continue to block 512 based on a determination that the Hamming distance determined at block 508 does equal 1 while the logic flow 500 can continue to block 516 based on a determination that the Hamming distance determined at block 508 does not equal 1.

At block 512, a counter block can be generated based on the incremented Gray code. For example, processing circuitry of HD fault tolerant counter 300 can generate a counter block based on the incremented Gray code (e.g., the current state of the Gray code counter 310). Continuing to block 514, the stored state of the Gray code counter can be updated to the incremented Gray code. For example, the counter state register 320 can store the incremented state of the Gray code counter 310 (e.g., the current state of the Gray code counter 310). From block 514, the logic flow 500 can continue by returning to block 506. At block 516, a fault can be identified. For example, processing circuitry of HD fault tolerant counter 300 can generate a flag including an indicating of a fault in HD fault tolerant counter 300.

Figure 6:
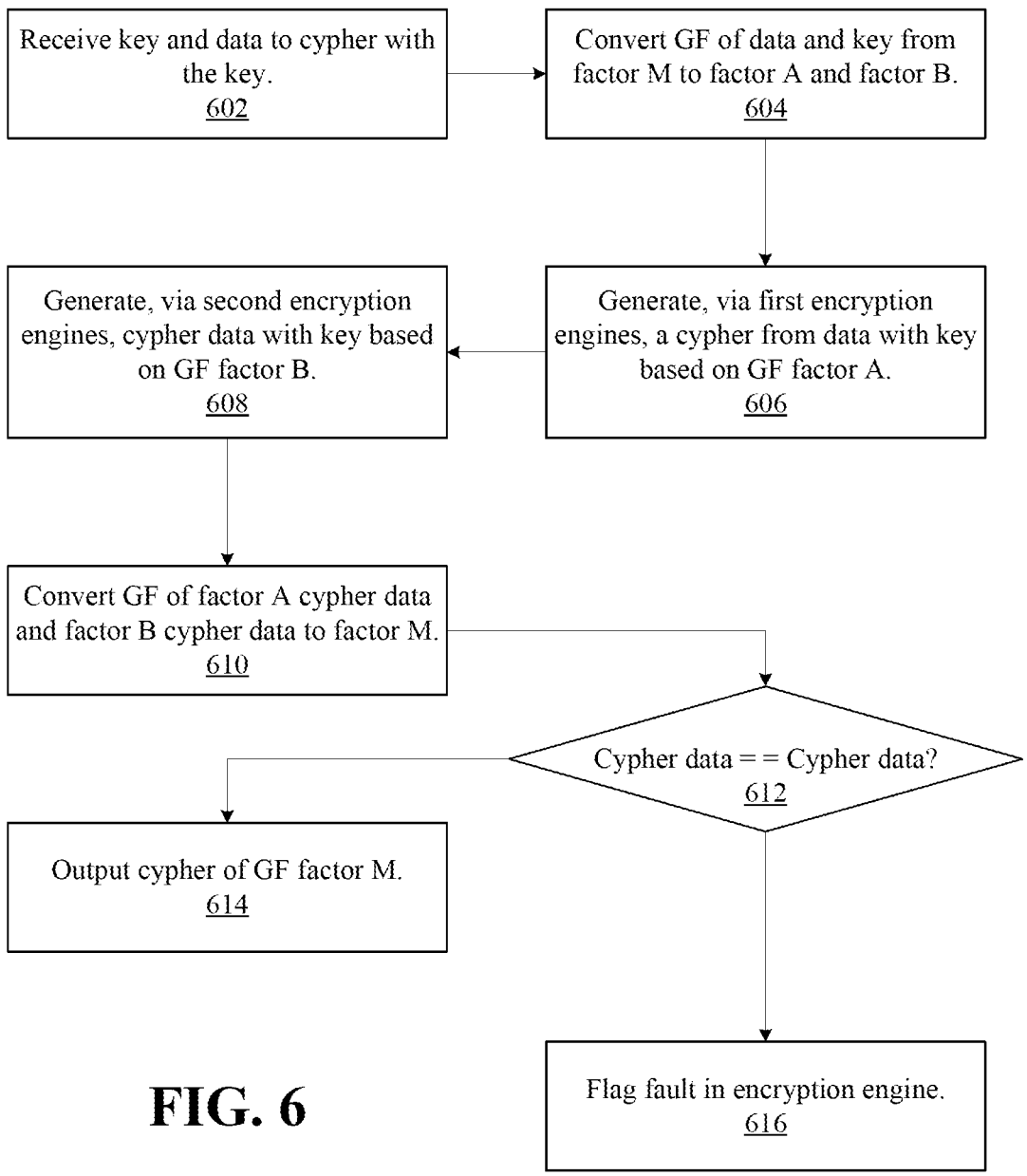
FIG. 6 illustrates a logic flow for a complementary flow fault tolerant encryption engine.

FIG. 6 illustrates an example flow diagram 600 for a complementary flow fault tolerant encryption engine, according to embodiments of the present disclosure. It may be understood that the features described in each block may be executed by processing circuitry, such as, processing circuitry in a device arranged to encrypt/decrypt data for communication via a network (e.g., a V2X network) or the like. For example, one of vehicles 110 and/or RSU 130 can implement logic flow 600 as part of an encryption/decryption process during communication via V2X network 140. As a specific example, complementary flow fault tolerant encryption engine 400 can implement logic flow 600.

Logic flow 600 can begin at block 602. At block 602, a key and data to cypher with the key can be received. For example, processing circuitry of complementary flow fault tolerant encryption engine 400 can receive data and a key (e.g. key 250, or the like). It is to be appreciated, that the data received will depend on the actual encryption algorithm (e.g., AES-CCM, or the like), the phase of the encryption algorithm (e.g., text cypher, tag cypher, or the like), as well as whether the system is encrypting or decrypting.

Continuing to block 604, the GF of the data and the GF of the key can be converted from GF(M) to GF(A) and GF(B). For example, processing blocks 412 of encryption engine A 410 can convert the data and key from GF(M) to GF(A). As a specific example, processing blocks 412 of encryption engine A 410 can convert the data and key from $GF(2^8)$ to $GF(2^4)^2$. Similarly, processing blocks 422 of encryption engine B 420 can convert the data and key from GF(M) to GF(B). As a specific example, processing blocks 422 of encryption engine B 420 can convert the data and key from $GF(2^8)$ to $GF((2^2)^2)^2$.

Continuing to block 606, cypher from data can be generated using an encryption algorithm based on a GF factor A. For example, encryption engine A 410 can generate a cypher (or data out) based on an encryption algorithm or certificate (e.g., AES, DES, digital signature certificate (DSC), or the like) using the key having GF factor A. As a specific example, encryption engine A 410 can generate a 128 bit cypher from 128 bit data using key 250 based on application of the AES algorithm with $GF(2^4)^2$.

Continuing to block 608, cypher from data can be generated using an encryption algorithm based on a GF factor B. For example, encryption engine B 420 can generate a cypher (or data out) based on an encryption algorithm (e.g., AES, DES, DSC, or the like) using the key having GF factor B. As a specific example, encryption engine B 420 can generate a 128 bit cypher from 128 bit data using key 250 based on application of the AES algorithm with $GF((2^2)^2)^2$.

Continuing to block 610, the cyphers (e.g., data out) generated at blocks 606 and 608 can be converted from GF factors A and B, respectively, to GF factor M. For example, processing block 414 of encryption engine A 410 can convert the cypher data from GF(A) to GF(M). As a specific example, processing block 414 of encryption engine A 410 can convert the cypher data from $GF(2^4)^2$ to $GF(2^8)$. Similarly, processing block 424 of encryption engine B 420 can convert the cypher data GF(B) to GF(M). As a specific example, processing block 424 of encryption engine B 420 can convert the cypher data from $GF((2^2)^2)^2$ to $GF(2^8)$.

Continuing to decision block 612, it is determined whether the cyphers (e.g., data out) generated at blocks 606 and 608, and converted to the same GF factor, are equal. For example, processing circuitry of complementary flow fault tolerant encryption engine 400 can determine whether the generated cyphers are equal. As a specific example, processing circuitry of complementary flow fault tolerant encryption engine 400 can determine whether the 128 bit cypher generated with $GF(2^4)^2$ at block 606 and converted to $GF(2^8)$ at block 610 equals the 128 bit cypher generated with $GF((2^2)^2)^2$ at block 608 and converted to $GF(2^8)$ at block 610. From decision block 612 logic flow 600 can continue to either block 614 or block 616. For example, the logic flow 600 can continue to block 614 based on a determination that the cyphers do equal each other while the logic flow 600 can continue to block 616 based on a determination that the cyphers do not equal each other.

At block 614, the cypher of GF factor M can be output. For example, processing circuitry of complementary flow fault tolerant encryption engine 400 can output data corresponding to the cypher generated by one of blocks 606 or 608 and converted to GF factor M. As a specific example, a 128 bit cypher generated with $GF(2^4)^2$ at block 606 and converted to $GF(2^8)$ at block 610 can be output. At block 616, a fault can be identified. For example, processing circuitry of complementary flow fault tolerant encryption engine 400 can generate a flag including an indicating of a fault in complementary flow fault tolerant encryption engine 400.

Figure 7:
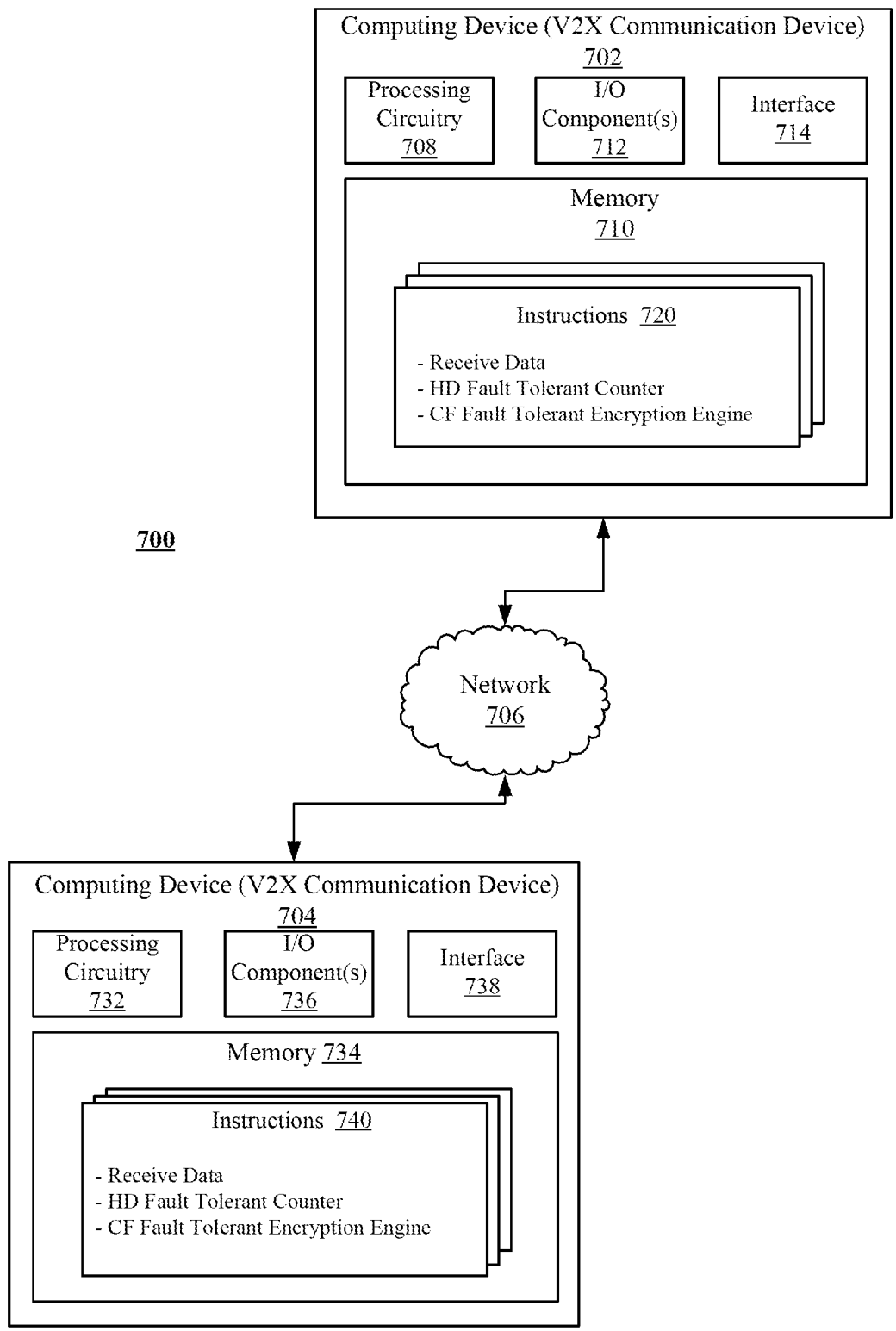
FIG. 7 illustrates a system of computing devices.

FIG. 7 illustrates an example system 700 for FUSA execution of encryption operations for encrypted communication, such as, over a V2X network. As shown, system 700 includes at least two computing devices connected to each other via a network. For example, this figure depicts computing device (V2X communication device) 702 coupled to computing device (V2X communication device) 704 via network 706. Additional (although not shown) computing devices corresponding to other devise (e.g., vehicles 110, RSU 130, etc.) may also be connected to the devices 702 and/or 704 via the network 706.

Network 706 could be a local area network (LAN), a wide area network (WAN), or a cellular network (e.g., LTE, 3GPP, or the like). In some embodiments, network 706 could include the Internet. In other implementations, network 706 can be an ad-hock network or a peer-to-peer (P2P) network based on one or more V2X standards (e.g., V2V, V2I, or the like).

As illustrated, the computing device vehicle 702 may include processing circuitry (e.g., a processor, microprocessor, ASIC) 708, memory 710, I/O component(s) 712, and interface 714. Memory 710 may store one or more instructions 720 for FUSA execution of encrypted communication via network 706 (e.g., a V2X network). For example, instructions 720 may include instructions for receiving data. With some examples, the data can be data to be encrypted and transmitted via network 706. For example, the data can be messages generated by processing circuitry 708 and/or components 712. In some examples, the data can be data to be decrypted, such as, data received via network 706. For example, the data can include packet data (e.g., a protocol data unit (PDU), or the like).

Instructions 720 may further include a Hamming distance fault tolerant counter to generate a counter block for an encryption algorithm based on a Gray code and Hamming distance as described herein. For example, instructions 720 can include instructions to generate a counter block based on Hamming distance fault tolerant counter 300 described herein. Instructions 720 may further include a complementary flow fault tolerant encryption engine to generate a cypher based on complementary encryption flows as described herein. For example, instructions 720 can include instructions to generate a cypher based on complementary flow fault tolerant encryption engine 400 described herein.

As further illustrated in this figure, computing device 704 may include processing circuitry 732, memory 734, I/O components 736, and interface 738. Similar to memory 710 of misbehaving computing device 702, memory 734 may store various data or information, such as instructions 740, for FUSA execution of encrypted communication via network 706 (e.g., a V2X network). For example, instructions 740 may include instructions for receiving data. With some examples, the data can be data to be encrypted and transmitted via network 706. For example, the data can be messages generated by processing circuitry 732 and/or components 736. In some examples, the data can be data to be decrypted, such as, data received via network 706. For example, the data can include packet data (e.g., a protocol data unit (PDU), or the like).

Instructions 740 may further include a Hamming distance fault tolerant counter to generate a counter block for an encryption algorithm based on a Gray code and Hamming distance as described herein. For example, instructions 740 can include instructions to generate a counter block based on Hamming distance fault tolerant counter 300 described herein. Instructions 740 may further include a complementary flow fault tolerant encryption engine to generate a cypher based on complementary encryption flows as described herein. For example, instructions 740 can include instructions to generate a cypher based on complementary flow fault tolerant encryption engine 400 described herein.

The instructions and data stored in memory 720 may be executable or executed by the processing circuitry 708; while the instructions and data stored in memory 740 may be executable or executed by the processing circuitry 732. Other information stored in memory 720 may also be accessible by or provided to the processing circuitry 708. Likewise, other information stored in memory 740 may also be accessible by or provided to the processing circuitry 732. As illustrated, it may further be understood that multiple sets of instructions 720 may be included in memory 710 and multiple sets of instructions 740 may be included in memory 734.

According to examples, the processing circuitry 708 and/or 732 may include circuitry or processor logic, such as, for example, any of a variety of commercial processors. In some examples, they may include multiple processors, a multi-threaded processor, a multi-core processor (whether the multiple cores coexist on the same or separate dies), and/or a multi-processor architecture of some other variety by which multiple physically separate processors are in some way linked.

The memories 710 and/or 734 may include logic, a portion of which includes arrays of integrated circuits, forming non-volatile memory to persistently store data or a combination of non-volatile memory and volatile memory. It is to be appreciated, that the memories 710 and/or 734 may be based on any of a variety of technologies. In particular, the arrays of integrated circuits included in the memories may be arranged to form one or more types of memory, such as, for example, dynamic random access memory (DRAM), NAND memory, NOR memory, or the like.

The I/O component(s) 712 and/or 736 may include one or more components to provide input to or to provide output from the computing device 702 and/or the computing device 704. For example, the I/O component(s) 712 and/or 736 may be a keyboard (hardware, virtual, etc.), mouse, joystick, microphone, track pad, button, touch layers of a display, a heads-up display, haptic feedback device, camera, microphone, speaker, or the like.

Interfaces 714 and/or 738 may include logic and/or features to support a communication interface. For example, they may include one or more interfaces that operate according to various communication protocols or standards to communicate over direct or network communication links. Direct communications may occur via use of communication protocols or standards described in one or more industry standards (including progenies and variants). For example, the interfaces 714 and/or 738 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Figure 8:
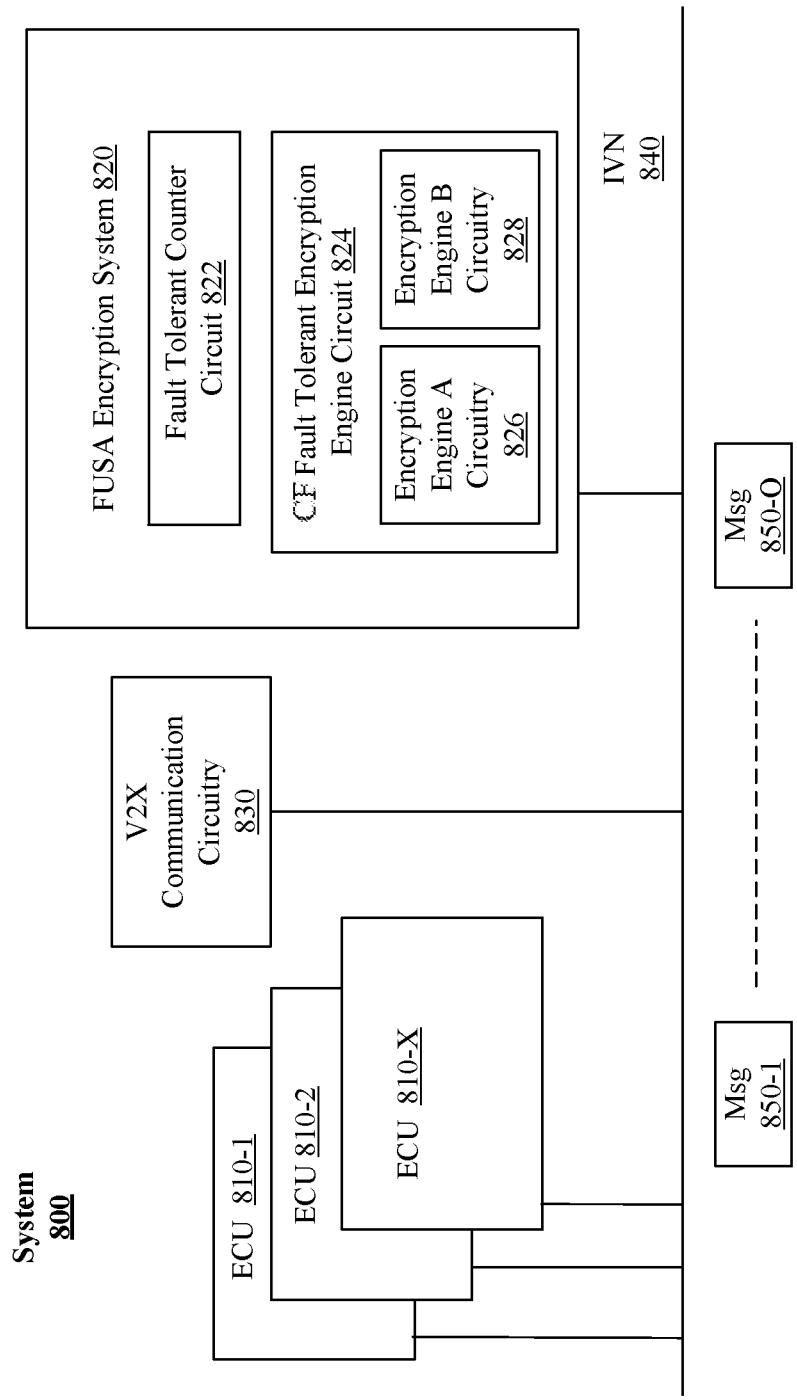
FIG. 8 illustrates a vehicle architecture.

FIG. 8 illustrates a system 800 that can be implemented in a vehicle arranged for FUSA execution of encryption operations as described herein. System 800 can be implemented in one of vehicle 110 of system 100 of FIG. 1. System 800 includes a number of electronic control units (ECUs) 810 coupled to FUSA encryption system 820 and V2X communication circuitry 830 via an in-vehicle network (IVN) 840. For example, ECUs 810-1, 810-2 through 810-X are depicted. In some examples, IVN 840 can be a controller area network (CAN) bus, a FlexRay bus, a CAN FD bus, an automotive ethernet bus, or a local interconnected network (LIN) bus, or the like.

In general, ECUs 810 include circuitry arranged to generate and/or consume messages 850. Messages are communicated via IVN 840 and can include indications of data (e.g., sensor data, or the like) or commands (e.g., actuator commands, or the like). In some examples, ECUs 810 can include any of a variety of sensors, actuators, controllers, telecommunications, infotainment, etc. Any number of messages 850 can be generated by ECUs 810. Messages 850-1 to 850-0 are depicted.

V2X communication circuitry 830 may send messages (e.g., messages 850, or other messages not depicted) via a V2X network (e.g., network 140, or the like). FUSA encryption system 820 may encrypt/decrypt the messages sent/received by V2X communication circuitry 840. V2X communication circuitry can include radios, antennas, baseband processors, physical layer circuitry, etc. arranged to transmit and receive signals via a network.

FUSA encryption system 820 includes a Hamming distance fault tolerant counter circuitry 822 and complementary flow fault tolerant encryption engine circuitry 824. The complementary flow fault tolerant encryption engine circuitry 824 includes an encryption engine A circuit 826 arranged to generate a cypher based on an encryption algorithm having a GF of factor A. Additionally, the complementary flow fault tolerant encryption engine circuitry 824 includes an encryption engine B circuit 828 arranged to generate a cypher based on an encryption algorithm having a GF of factor B.

Figure 9:
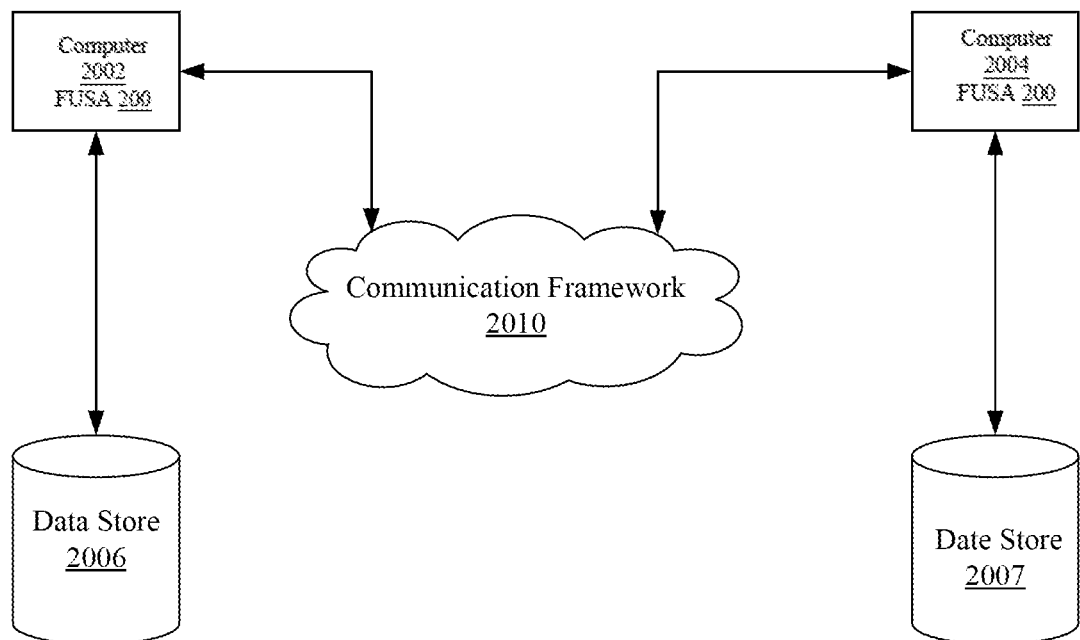
FIG. 9 illustrates a communications architecture.

FIG. 9 illustrates an exemplary communications architecture 2000 suitable for implementing various embodiments. For example, one or more computing devices may communicate with each other via a communications framework 2010, which may be a network implemented to facilitate V2X communications. Further, the devices can provide FUSA execution of encryption operations (e.g., to encrypt the V2X communication) as described herein.

The communications architecture 2000 includes various common communications elements, such as a transmitter, receiver, transceiver, radio, network interface, baseband processor, antenna, amplifiers, filters, power supplies, and so forth. The embodiments, however, are not limited to implementation by the communications architecture 2000.

As shown in this figure, the communications architecture 2000 includes a computer 2002 and a computer 2004, which are operatively connected to one or more respective client data stores 2006 and 2007 that can be employed to store information local to the respective computers 2002 and servers 2004, such as cookies and/or associated contextual information.

Computers 2002 and 2004 may communicate information between each other using a communication framework 2010. Computers 2002 and 2004 may provide FUSA execution of encryption operations as part of the communicating information between each other using communication framework 2010. In one example, computer 2002 may be implemented or configured in an RSU, and further, computer 2004 may be implemented or configured in a vehicle. The communications framework 2010 may implement any well-known communications techniques and protocols. The communications framework 2010 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2010 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 2002 and 2004. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1. An apparatus, comprising: processing circuitry; and memory coupled to the processing circuitry, the memory comprising instructions that when executed by the processing circuitry cause the processing circuitry to: convert a Galois Field (GF) of an encryption key from a first factor to a second factor and a third factor, convert a GF of a data block from the first factor to the second factor and the third factor, generate a first cypher block of the data block having the GF of the second factor based on based on an encryption algorithm and the encryption key having the GF of the second factor, the encryption algorithm applied based on the second factor GF, generate a second cypher block of the data block having the GF of the third factor based on based on the encryption algorithm and the encryption key having the GF of the third factor, the encryption algorithm applied based on the third factor GF, and determine whether a fault in the execution of the encryption algorithm exists based on the first cypher block and the second cypher block.

Example 2. The apparatus of example 1, the instructions when executed by the processing circuitry cause the processing circuitry to: convert a GF of the first cypher block from the second factor to the first factor; convert a GF of the second cypher block from the third factor to the first factor; determine whether the first cypher block having the GF of the first factor equals the second cypher block having the GF of the second factor; and identify a fault in the execution of the encryption algorithm based on a determination that the first cypher block having the GF of the first factor does not equal the second cypher block having the GF of the second factor.

Example 3. The apparatus of example 1, the instructions when executed by the processing circuitry cause the processing circuitry to output the first cypher block having the GF of the first factor as cypher data of the encryption algorithm based on a determination that the first cypher block having the GF of the first factor equals the second cypher block having the GF of the second factor.

Example 4. The apparatus of example 3, the instructions when executed by the processing circuitry cause the processing circuitry to generate a message for transmission on a network, the message based on the cypher data.

Example 5. The apparatus of example 4, comprising a radio arranged to broadcast the message on the network.

Example 6. The apparatus of example 5, the network a vehicle to anything (V2X) communication network.

Example 7. The apparatus of example 1, the instructions when executed by the processing circuitry cause the processing circuitry to: determine a Hamming distance between a current value of a Gray code counter and a previous value of a Gray code counter; determine whether the Hamming distance equals one; and generate a counter block for block chaining mode of the encryption algorithm based on a determination that the Hamming distance equals one.

Example 8. The apparatus of example 7, the instructions when executed by the processing circuitry cause the processing circuitry to identify a fault in the execution of the encryption algorithm based on a determination that the that the Hamming distance does not equal one.

Example 9. The apparatus of example 1, the encryption algorithm an Advanced Encryption Standard (AES) counter cipher-block-chaining message authentication code (CBC-MAC) (AES-CCM) algorithm.

Example 10. At least one machine-readable storage medium comprising instructions that when executed by at least one processor, cause the at least one processor to: convert a Galois Field (GF) of an encryption key from a first factor to a second factor and a third factor; convert a GF of a data block from the first factor to the second factor and the third factor; generate a first cypher block of the data block having the GF of the second factor based on based on an encryption algorithm and the encryption key having the GF of the second factor, the encryption algorithm applied based on the second factor GF; generate a second cypher block of the data block having the GF of the third factor based on based on the encryption algorithm and the encryption key having the GF of the third factor, the encryption algorithm applied based on the third factor GF; and determine whether a fault in the execution of the encryption algorithm exists based on the first cypher block and the second cypher block.

Example 11. The at least one machine-readable storage medium of example 10, the instructions, when executed, cause the at least one processor to: convert a GF of the first cypher block from the second factor to the first factor; convert a GF of the second cypher block from the third factor to the first factor; determine whether the first cypher block having the GF of the first factor equals the second cypher block having the GF of the second factor; and identify a fault in the execution of the encryption algorithm based on a determination that the first cypher block having the GF of the first factor does not equal the second cypher block having the GF of the second factor.

Example 12. The at least one machine-readable storage medium of example 10, the instructions, when executed, cause the at least one processor to output the first cypher block having the GF of the first factor as cypher data of the encryption algorithm based on a determination that the first cypher block having the GF of the first factor equals the second cypher block having the GF of the second factor.

Example 13. The at least one machine-readable storage medium of example 12, the instructions, when executed, cause the at least one processor to generate a message for transmission on a network, the message based on the cypher data.

Example 14. The at least one machine-readable storage medium of example 13, the instructions, when executed, cause the at least one processor to broadcast, via a radio, the message on the network.

Example 15. The at least one machine-readable storage medium of example 13, wherein the network is a vehicle to anything (V2X) communication network.

Example 16. The at least one machine-readable storage medium of example 10, the instructions, when executed, cause the at least one processor to: determine a Hamming distance between a current value of a Gray code counter and a previous value of a Gray code counter; determine whether the Hamming distance equals one; and generate a counter block for block chaining mode of the encryption algorithm based on a determination that the Hamming distance equals one.

Example 17. The at least one machine-readable storage medium of example 16, the instructions, when executed, cause the at least one processor to identify a fault in the execution of the encryption algorithm based on a determination that the that the Hamming distance does not equal one.

Example 18. The at least one machine-readable storage medium of example 10, the encryption algorithm an Advanced Encryption Standard (AES) counter cypher-block-chaining message authentication code (CBC-MAC) (AES-CCM) algorithm.

Example 19. A method, comprising: converting a Galois Field (GF) of an encryption key from a first factor to a second factor and a third factor; converting a GF of a data block from the first factor to the second factor and the third factor; generating a first cypher block of the data block having the GF of the second factor based on based on an encryption algorithm and the encryption key having the GF of the second factor, the encryption algorithm applied based on the second factor GF; generating a second cypher block of the data block having the GF of the third factor based on based on the encryption algorithm and the encryption key having the GF of the third factor, the encryption algorithm applied based on the third factor GF; and determining whether a fault in the execution of the encryption algorithm exists based on the first cypher block and the second cypher block.

Example 20. The method of example 19, comprising: converting a GF of the first cypher block from the second factor to the first factor; converting a GF of the second cypher block from the third factor to the first factor; determining whether the first cypher block having the GF of the first factor equals the second cypher block having the GF of the second factor; and identifying a fault in the execution of the encryption algorithm based on a determination that the first cypher block having the GF of the first factor does not equal the second cypher block having the GF of the second factor.

Example 21. The method of example 19, comprising outputting the first cypher block having the GF of the first factor as cypher data of the encryption algorithm based on a determination that the first cypher block having the GF of the first factor equals the second cypher block having the GF of the second factor.

Example 22. The method of example 21, comprising generating a message for transmission on a network, the message based on the cypher data.

Example 23. The method of example 22, comprising broadcasting, via a radio, the message on the network.

Example 24. The method of example 22, wherein the network is a vehicle to anything (V2X) communication network.

Example 25. The method of example 19, comprising: determining a Hamming distance between a current value of a Gray code counter and a previous value of a Gray code counter; determining whether the Hamming distance equals one; and generating a counter block for block chaining mode of the encryption algorithm based on a determination that the Hamming distance equals one.

Example 26. The method of example 25, comprising identifying a fault in the execution of the encryption algorithm based on a determination that the that the Hamming distance does not equal one.

Example 27. The method of example 19, the encryption algorithm an Advanced Encryption Standard (AES) counter cipher-block-chaining message authentication code (CBC-MAC) (AES-CCM) algorithm.

Example 28. An apparatus, comprising means arranged to implement the function of any one of examples 19 to 27.

Example 29. An apparatus for a functionally safe (FUSA) executable encryption circuit, comprising: a complementary flow fault tolerant encryption engine circuit, comprising: a Galois Field (GF) converter circuit, the GF converter circuit arranged to: convert a GF of an encryption key from a first factor to a second factor and a third factor, and convert a GF of a data block from the first factor to the second factor and the third factor, a first encryption engine circuit arranged to generate a first cypher block of the data block having the GF of the second factor based on based on an encryption algorithm and the encryption key having the GF of the second factor, the first encryption engine circuit arranged to apply the encryption algorithm based on the second factor GF, and a second encryption engine circuit arranged to generate a second cypher block of the data block having the GF of the third factor based on based on the encryption algorithm and the encryption key having the GF of the third factor, the second encryption engine circuit arranged to apply the encryption algorithm based on the third factor GF, a comparator arranged to compare whether the first cypher block and the second cypher block, and a fault circuit arranged to indicate a fault in the complementary flow fault tolerant encryption engine based on output of the comparator.

Example 30. The apparatus of example 29, the GF converter circuit to: convert a GF of the first cypher block from the second factor to the first factor; and convert a GF of the second cypher block from the third factor to the first factor.

Example 31. The apparatus of example 30, the comparator arranged to compare whether the first cypher block having the GF of the first factor equals the second cypher block having the GF of the second factor, the fault circuit to indicate the fault based on a determination that the first cypher block having the GF of the first factor does not equal the second cypher block having the GF of the second factor.

Example 32. The apparatus of example 31, the complementary flow fault tolerant encryption engine circuit to output the first cypher block having the GF of the first factor as cypher data based on a determination that the first cypher block having the GF of the first factor equals the second cypher block having the GF of the second factor.

Example 33. The apparatus of example 32, comprising network communication circuit arranged to generate a message for transmission on a network, the message based on the cypher data.

Example 34. The apparatus of example 33, comprising the network communication circuit comprising a radio and an antenna.

Example 35. The apparatus of example 34, the network a vehicle to anything (V2X) communication network.

Example 36. The apparatus of example 29, comprising a fault tolerant counter circuit comprising: a Gray code counter circuit to count in Gray code; a counter state register to store a prior value of the Gray code counter; a Hamming distance checker circuit arranged to determine a Hamming distance between a current value of the Gray code counter and the prior value of the Gray code counter; a counter block circuit arranged to generate a counter block based on the current value of the Gray code counter responsive to the Hamming distance equaling one.

Example 37. The apparatus of example 36, the fault tolerant counter circuit comprising a fault circuit to indicate a fault in the fault tolerant counter circuit responsive to the Hamming distance not equaling one.

Example 38. The apparatus of example 29, the encryption algorithm an Advanced Encryption Standard (AES) counter cipher-block-chaining message authentication code (CBC-MAC) (AES-CCM) algorithm.

Example 39. A system for a vehicle comprising: an electronic control unit (ECU) to generate a message; vehicle-to-anything (V2X) communication circuitry to transmit the message via a V2X network; an in-vehicle network (IVN); and a complementary flow fault tolerant encryption engine circuit to encrypt the message prior to transmission, comprising: a Galois Field (GF) converter circuit, the GF converter circuit arranged to: convert a GF of an encryption key from a first factor to a second factor and a third factor, and convert a GF of a data block from the first factor to the second factor and the third factor, a first encryption engine circuit arranged to generate a first cypher block of the data block having the GF of the second factor based on an encryption algorithm and the encryption key having the GF of the second factor, the first encryption engine circuit arranged to apply the encryption algorithm based on the second factor GF, and a second encryption engine circuit arranged to generate a second cypher block of the data block having the GF of the third factor based on the encryption algorithm and the encryption key having the GF of the third factor, the second encryption engine circuit arranged to apply the encryption algorithm based on the third factor GF, a comparator arranged to compare whether the first cypher block and the second cypher block, and a fault circuit arranged to indicate a fault in the complementary flow fault tolerant encryption engine based on output of the comparator.

Example 40. The system of example 39, the GF converter circuit to: convert a GF of the first cypher block from the second factor to the first factor; and convert a GF of the second cypher block from the third factor to the first factor.

Example 41. The system of example 40, the comparator arranged to compare whether the first cypher block having the GF of the first factor equals the second cypher block having the GF of the second factor, the fault circuit to indicate the fault based on a determination that the first cypher block having the GF of the first factor does not equal the second cypher block having the GF of the second factor.

Example 42. The system of example 41, the complementary flow fault tolerant encryption engine circuit to output the first cypher block having the GF of the first factor as cypher data based on a determination that the first cypher block having the GF of the first factor equals the second cypher block having the GF of the second factor.

Example 43. The system of example 39, comprising a fault tolerant counter circuit comprising: a Gray code counter circuit to count in Gray code; a counter state register to store a prior value of the Gray code counter; a Hamming distance checker circuit arranged to determine a Hamming distance between a current value of the Gray code counter and the prior value of the Gray code counter; a counter block circuit arranged to generate a counter block based on the current value of the Gray code counter responsive to the Hamming distance equaling one.

Example 44. The system of example 43, the fault tolerant counter circuit comprising a fault circuit to indicate a fault in the fault tolerant counter circuit responsive to the Hamming distance not equaling one.

Example 45. The system of example 39, the encryption algorithm an Advanced Encryption Standard (AES) counter cipher-block-chaining message authentication code (CBC-MAC) (AES-CCM) algorithm.

What is claimed is:

1. An apparatus, comprising:
processing circuitry; and
memory coupled to the processing circuitry, the memory comprising instructions that, when executed by the processing circuitry cause the processing circuitry to:
convert a Galois Field (GF) representation of an encryption key from a first factor to a second factor and a third factor;
convert a GF representation of a data block from the first factor to the second factor and the third factor;
determine a Hamming distance between a current value of a Gray code counter and a previous value of a Gray code counter;
determine whether the Hamming distance equals one;
generate one or more counter blocks for an encryption algorithm based on a determination that the Hamming distance equals one;
generate a first cypher block of the data block, the first cypher block having the GF representation of the second factor, based on the encryption algorithm and the encryption key having the GF representation of the second factor, wherein the encryption algorithm is applied based on the second factor GF;
generate a second cypher block of the data block, the second cypher block having the GF representation of the third factor, based on the encryption algorithm and the encryption key having the GF representation of the third factor, wherein the encryption algorithm is applied based on the third factor GF; and
determine whether a fault in the execution of the encryption algorithm exists based on the first cypher block and the second cypher block,
wherein:
the GF representation of the first factor is $GF(2^8)$;
the GF representation of the second factor is $GF((2^4)^2)$; and
the GF representation of the third factor is $GF(((2^2)^2)^2)$.

2. The apparatus of claim 1, wherein the instructions, when executed by the processing circuitry, further cause the processing circuitry to:
convert the GF representation of the first cypher block from the second factor to the first factor;
convert the GF representation of the second cypher block from the third factor to the first factor;
determine whether the first cypher block having the GF representation of the first factor equals the second cypher block having the GF representation of the first factor; and
identify a fault in the execution of the encryption algorithm based on a determination that the first cypher block having the GF representation of the first factor does not equal the second cypher block having the GF representation of the first factor.

3. The apparatus of claim 2, wherein the instructions, when executed by the processing circuitry, further cause the processing circuitry to output the first cypher block having the GF representation of the first factor as cypher data of the encryption algorithm based on a determination that the first cypher block having the GF representation of the first factor equals the second cypher block having the GF representation of the first factor.

4. The apparatus of claim 3, wherein the instructions, when executed by the processing circuitry, further cause the processing circuitry to generate a message for transmission on a network, wherein the message is based on the cypher data, wherein the network includes a vehicle to anything (V2X) communication network.

5. The apparatus of claim 4, further comprising a radio arranged to broadcast the message on the network.

6. The apparatus of claim 1, wherein the instructions, when executed by the processing circuitry, further cause the processing circuitry to identify a fault in the execution of the encryption algorithm based on a determination that the Hamming distance does not equal one.

7. The apparatus of claim 1, wherein the encryption algorithm comprises an Advanced Encryption Standard (AES) counter cipher-block-chaining message authentication code (CBC-MAC) (AES-CCM) algorithm.

8. A method, comprising:
converting a Galois Field (GF) representation of an encryption key from a first factor to a second factor and a third factor;
converting a GF representation of a data block from the first factor to the second factor and the third factor;
determining a Hamming distance between a current value of a Gray code counter and a previous value of a Gray code counter;
determining whether the Hamming distance equals one;
generating one or more counter blocks for an encryption algorithm based on a determination that the Hamming distance equals one;
generating a first cypher block of the data block, the first cypher block having the GF representation of the second factor, based on the encryption algorithm and the encryption key having the GF representation of the second factor, wherein the encryption algorithm is applied based on the second factor GF;
generating a second cypher block of the data block, the second cypher block having the GF representation of the third factor, based on the encryption algorithm and the encryption key having the GF representation of the third factor, wherein the encryption algorithm is applied based on the third factor GF; and
determining whether a fault in the execution of the encryption algorithm exists based on the first cypher block and the second cypher block;
wherein:
the GF representation of the first factor is $GF(2^8)$;
the GF representation of the second factor is $GF((2^4)^2)$; and
the GF representation of the third factor is $GF(((2^2)^2)^2)$.

9. The method of claim 8, further comprising:
converting the GF representation of the first cypher block from the second factor to the first factor;
converting the GF representation of the second cypher block from the third factor to the first factor;
determining whether the first cypher block having the GF representation of the first factor equals the second cypher block having the GF representation of the first factor; and
identifying a fault in the execution of the encryption algorithm based on a determination that the first cypher block having the GF representation of the first factor does not equal the second cypher block having the GF representation of the first factor.

10. The method of claim 9, further comprising outputting the first cypher block having the GF representation of the first factor as cypher data of the encryption algorithm based on a determination that the first cypher block having the GF representation of the first factor equals the second cypher block having the GF representation of the first factor.

11. The method of claim 10, further comprising generating a message for transmission on a network, wherein the message is based on the cypher data, and broadcasting, via a radio, the message on the network, wherein the network is a vehicle to anything (V2X) communication network.

12. The method of claim 8, further comprising identifying a fault in the execution of the encryption algorithm based on a determination that the Hamming distance does not equal one.

13. The method of claim 8, wherein the encryption algorithm comprises an Advanced Encryption Standard (AES) counter cipher-block-chaining message authentication code (CBC-MAC) (AES-CCM) algorithm.

14. A computer program product comprising a non-transitory machine-readable medium storing instructions that, when executed by at least one processor, cause the at least one processor to:
convert a Galois Field (GF) representation of an encryption key from a first factor to a second factor and a third factor;
convert a GF representation of a data block from the first factor to the second factor and the third factor;

determine a Hamming distance between a current value of a Gray code counter and a previous value of a Gray code counter;

determine whether the Hamming distance equals one;

generate one or more counter blocks for an encryption algorithm based on a determination that the Hamming distance equals one;

generate a first cypher block of the data block, the first cypher block having the GF representation of the second factor, based on the encryption algorithm and the encryption key having the GF representation of the second factor, wherein the encryption algorithm is applied based on the second factor GF;

generate a second cypher block of the data block, the second cypher block having the GF representation of the third factor, based on the encryption algorithm and the encryption key having the GF representation of the third factor, wherein the encryption algorithm applied based on the third factor GF; and determine whether a fault in the execution of the encryption algorithm exists based on the first cypher block and the second cypher block, wherein:
the GF representation of the first factor is $GF(2^8)$;
the GF representation of the second factor is $GF((2^4)^2)$; and
the GF representation of the third factor is $GF(((2^2)^2)^2)$.

15. The computer program product of claim 14, wherein the instructions, when executed by the at least one processor, further cause the at least one processor to:

convert the GF representation of the first cypher block from the second factor to the first factor;

convert the GF representation of the second cypher block from the third factor to the first factor;

determine whether the first cypher block having the GF representation of the first factor equals the second cypher block having the GF representation of the first factor; and identify a fault in the execution of the encryption algorithm based on a determination that the first cypher block having the GF representation of the first factor does not equal the second cypher block having the GF representation of the first factor.

16. The computer program product of claim 15, wherein the instructions, when executed by the at least one processor, further cause the at least one processor to output the first cypher block having the GF representation of the first factor as cypher data of the encryption algorithm based on a determination that the first cypher block having the GF representation of the first factor equals the second cypher block having the GF representation of the first factor.

17. The computer program product of claim 16, wherein the instructions, when executed by the at least one processor, further cause the at least one processor to generate a message for transmission on a network, wherein the message is based on the cypher data, wherein the network includes a vehicle to anything (V2X) communication network.

18. The computer program product of claim 17, wherein a radio is arranged to broadcast the message on the network.

19. The computer program product of claim 14, wherein the instructions, when executed by the at least one processor, further cause the at least one processor to identify a fault in the execution of the encryption algorithm based on a determination that the Hamming distance does not equal one.

20. The computer program product of claim 14, wherein the encryption algorithm comprises an Advanced Encryption Standard (AES) counter cipher-block-chaining message authentication code (CBC-MAC) (AES-CCM) algorithm.

* * * * *